United States Patent [19]

Brooks et al.

[11] Patent Number: 5,404,664
[45] Date of Patent: Apr. 11, 1995

[54] LICENSE PLATE SECURITY FRAME

[76] Inventors: David H. Brooks, 3007 Baker St., Baltimore, Md. 21216; Denver A. Harris, 4727 Amberley Ave., Baltimore, Md. 21229

[21] Appl. No.: 170,759

[22] Filed: Dec. 21, 1993

[51] Int. Cl.⁶ .............................................. G09F 7/00
[52] U.S. Cl. ........................................ 40/202; 40/209
[58] Field of Search ............... 40/202, 209, 655, 201; 24/590, 591; 248/466, 475.1

[56] References Cited

U.S. PATENT DOCUMENTS

| | | | |
|---|---|---|---|
| 314,671 | 3/1885 | Hellmuth | 24/591 X |
| 1,201,786 | 10/1916 | Willwerscheid | 40/209 X |
| 1,561,420 | 11/1925 | Elliott | 40/209 |
| 2,245,851 | 6/1941 | Campbell | 40/209 |
| 3,187,452 | 6/1965 | Dotson | 40/202 |
| 3,685,188 | 8/1972 | Syversen | 40/201 |
| 3,900,770 | 8/1975 | Kaufman | |
| 4,092,695 | 5/1978 | Henderson et al. | |
| 4,903,422 | 2/1990 | Varga | 40/201 |
| 5,012,602 | 5/1991 | Storey | 40/201 |
| 5,193,048 | 3/1993 | Kaufman et al. | |

*Primary Examiner*—Kenneth J. Dorner
*Assistant Examiner*—Joanne Silbermann

[57] ABSTRACT

A license plate security frame for preventing a theft or unauthorized removal of a license plate from a vehicle. The device includes an outer frame which receives the license plate and attaches to the vehicle body with the license plate bolts. An inner frame is pivotally mounted to the outer frame and may be locked to the same by a pair of secretly hidden locking members. The inner frame includes a pair of bolt guards which effectively preclude access to the license plate bolts and conceal the locking members when the inner frame is locked to the outer frame. Alternate embodiments of the present invention include corner lock assemblies for further locking the frames together, and an electric shock assembly connectable to a vehicle alarm or ignition system for energizing a partially insulated and partially exposed wire along the perimeter of the outer frame, whereby contact with the wire by unauthorized persons will result in a shock.

4 Claims, 4 Drawing Sheets

LICENSE PLATE SECURITY FRAME

BACKGROUND OF THE INVENTION

1. Field of the Invention

The present invention relates to frames and more particularly pertains to a license plate security frame for preventing a theft or unauthorized removal of a license plate from a vehicle.

2. Description of the Prior Art

The use of frames is known in the prior art. More specifically, frames heretofore devised and utilized for the purpose of securing license plates are known to consist basically of familiar, expected and obvious structural configurations, notwithstanding the myriad of designs encompassed by the crowded prior art which have been developed for the fulfillment of countless objectives and requirements.

For example, a license plate security locking device is illustrated in U.S. Pat. No. 3,685,188 in which a motor vehicle license plate is locked in place directly on a support such as the bumper of a motor vehicle. The device includes at least one key operating locking member which fastens the license plate to the bumper through an engagement with the inner face of the bumper to prevent unauthorized removal of the license plate and/or locking member from the bumper.

A license plate frame assembly is disclosed in U.S. Pat. No. 4,903,422 which may be utilized for displaying and protecting a vehicle license plate or identification tag. The assembly includes a generally rectangular frame with a rearwardly extending wall portion and an open center portion. The frame is secured from the rear portion thereof, with fasteners being extended through a generally planer surface thereof, thereby preventing its unauthorized removal.

Another patent of interest is U.S. Pat. No. 5,012,602 which describes a locking license plate holder for mounting license plates on automobiles, trucks, and trailers. The holder includes a frame having a channel formed therein dimensioned for insertion of a license plate. A transparent cover plate provided with an elongated lock housing may be positioned in front of the license plate within the frame and locked to the frame to secure the license plate therebehind.

While these devices fulfill their respective, particular objectives and requirements, the aforementioned patents do not disclose a license plate security frame for preventing a theft or unauthorized removal of a license plate from a vehicle which includes an outer frame attachable to the vehicle body with the license plate bolts and an inner frame pivotally mounted to the outer frame which may be locked thereto by a pair of secretly hidden locking members to effectively preclude access to the license plate bolts. Furthermore, none of the known prior art frames teach or suggest a license plate security frame which further includes corner lock assemblies for further locking the frames together, and an electric shock assembly connectable to a vehicle alarm or ignition system for energizing a partially insulated and partially exposed wire along the perimeter of the outer frame, whereby contact with the wire and the frame will result in a shock.

In these respects, the license plate security frame according to the present invention substantially departs from the conventional concepts and designs of the prior art, and in so doing provides an apparatus primarily developed for the purpose of preventing a theft or unauthorized removal of a license plate from a vehicle.

SUMMARY OF THE INVENTION

In view of the foregoing disadvantages inherent in the known types of frames now present in the prior art, the present invention provides a new license plate security frame construction wherein the same can be utilized for preventing a theft or unauthorized removal of a license plate from a vehicle. As such, the general purpose of the present invention, which will be described subsequently in greater detail, is to provide a new license plate security frame apparatus which has many of the advantages of the frames mentioned heretofore and many novel features that result in a license plate security frame which is not anticipated, rendered obvious, suggested, or even implied by any of the prior art frames, either alone or in any combination thereof.

To attain this, the present invention generally comprises a license plate security frame for preventing a theft or unauthorized removal of a license plate from a vehicle. The device includes an outer frame which receives the license plate and attaches to the vehicle body with the license plate bolts. An inner frame is pivotally mounted to the outer frame and may be locked to the same by a pair of secretly hidden locking members. The inner frame includes a pair of bolt guards which effectively preclude access to the license plate bolts and conceal the locking members when the inner frame is locked to the outer frame. Alternate embodiments of the present invention include corner lock assemblies for further locking the frames together, and an electric shock assembly connectable to a vehicle alarm or ignition system for energizing a partially insulated and partially exposed wire along the perimeter of the outer frame, whereby contact with the wire by unauthorized persons will result in a shock.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new license plate security frame apparatus which has many of the advantages of the frames mentioned heretofore and many novel features that result in a license plate security frame which is not anticipated, rendered obvious, suggested, or even implied by any of the prior art frames, either alone or in any combination thereof.

It is another object of the present invention to provide a new license plate security frame which may be easily and efficiently manufactured and marketed.

It is a further object of the present invention to provide a new license plate security frame which is of a durable and reliable construction.

An even further object of the present invention is to provide a new license plate security frame which is susceptible of a low cost of manufacture with regard to both materials and labor, and which accordingly is then susceptible of low prices of sale to the consuming public, thereby making such license plate security frames economically available to the buying public.

Still yet another object of the present invention is to provide a new license plate security frame which provides in the apparatuses and methods of the prior art some of the advantages thereof, while simultaneously overcoming some of the disadvantages normally associated therewith.

Still another object of the present invention is to provide a new license plate security frame for preventing a theft or unauthorized removal of a license plate from a vehicle.

Yet another object of the present invention is to provide a new license plate security frame that includes an outer frame which receives the license plate and attaches to the vehicle body with the license plate bolts, and an inner frame pivotally mounted to the outer frame and lockable to the same by a pair of secretly hidden locking members to effectively preclude access to the license plate bolts.

Even still another object of the present invention is to provide a new license plate security frame which further includes inconspicuous corner lock assemblies for further locking the frames together.

Even still yet another object of the present invention is providing new license plate security frame which still further includes an electric shock assembly connectable to a vehicle alarm or ignition system for energizing a partially insulated and partially exposed wire extending along the perimeter of the outer frame, whereby contact with the wire and the frame by unauthorized persons will result in a shock.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
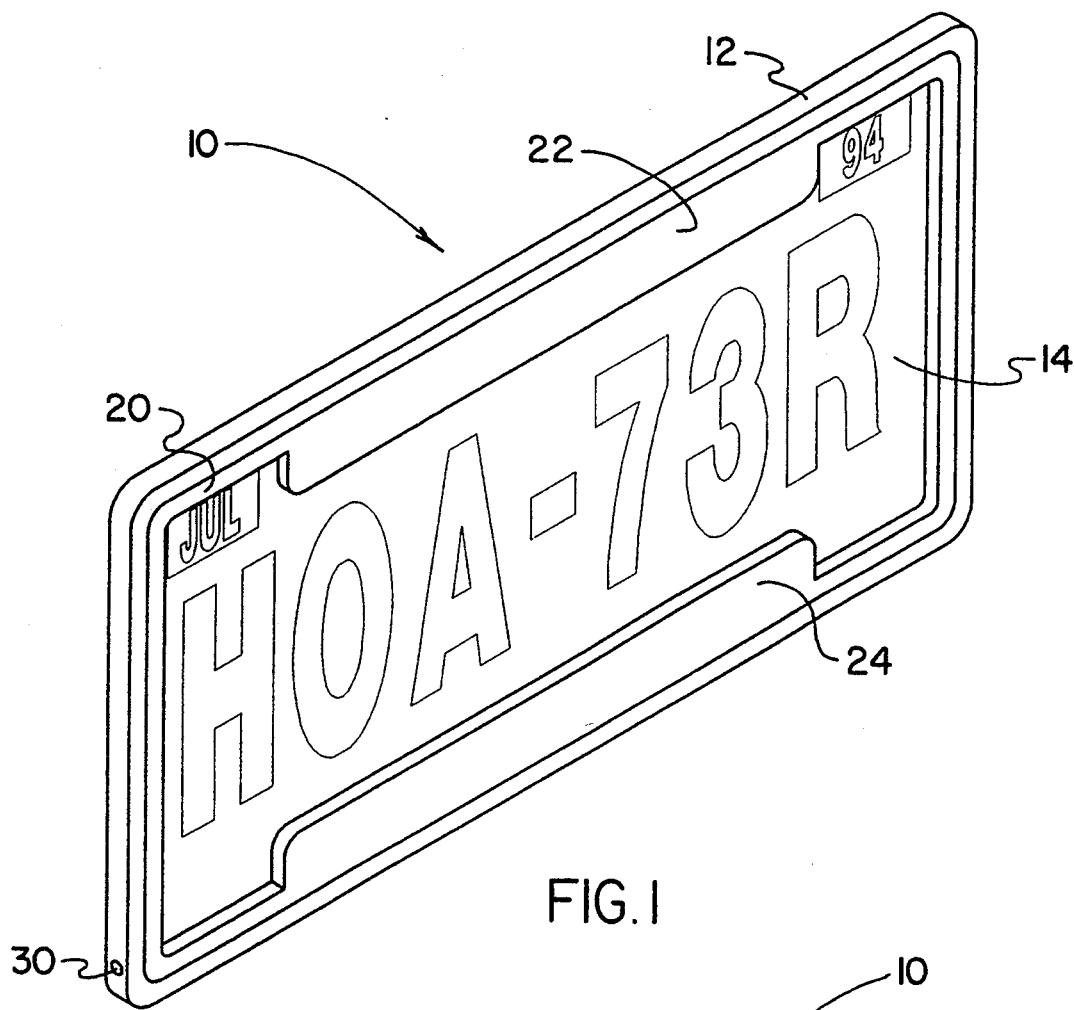
FIG. 1 is a perspective view of a license plate security frame comprising the present invention.

With reference now to the drawings, and in particular to FIGS. 1-4 thereof, a first embodiment of a new license plate security frame embodying the principles and concepts of the present invention and generally designated by the reference numeral 10 will be described.

Figure 4:
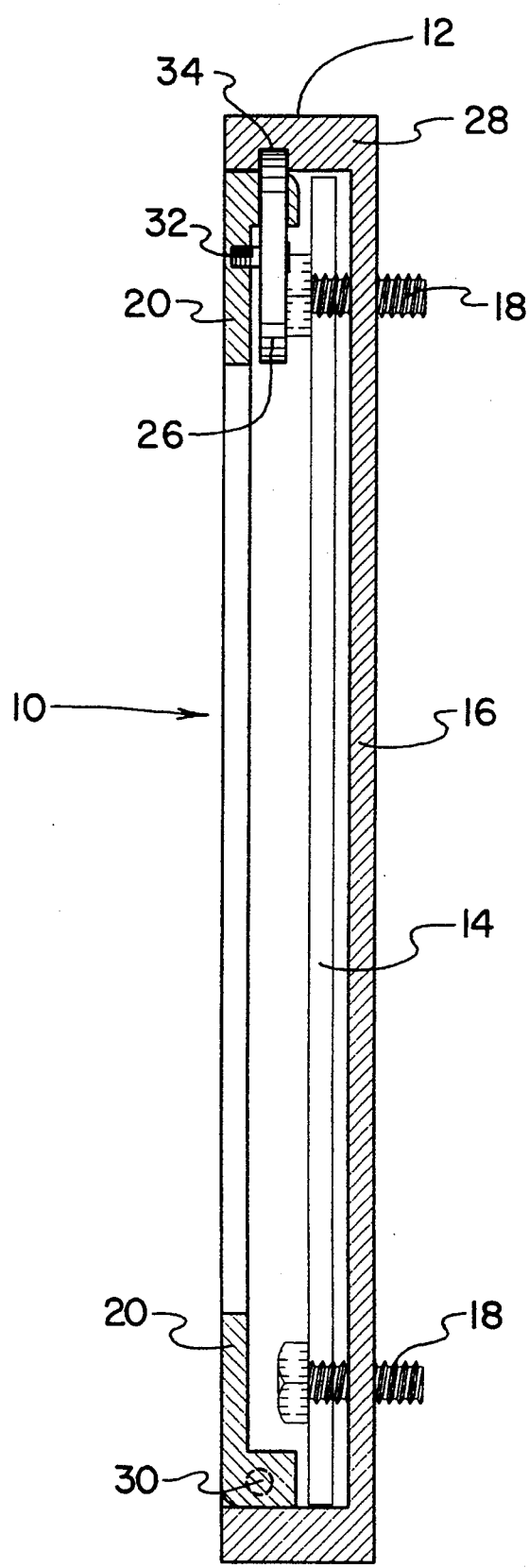
FIG. 4 is a cross-sectional view taken along line 4—4 of FIG. 2.

From an overview standpoint, the license plate security frame 10 comprises an outer frame 12 which is substantially rectangular in shape and is sized to receive a conventional license plate 14. As best illustrated in FIG. 4, the outer frame 12 includes a backing plate 16 having appropriately positioned through-extending apertures which allow the outer frame to be secured to an unillustrated vehicle by license plate bolts 18 which extend through both the license plate 14 and the backing plate 16. This allows the license plate security frame 10 to be conveniently attached to a conventional vehicle body without a substantial modification thereof.

Figure 2:
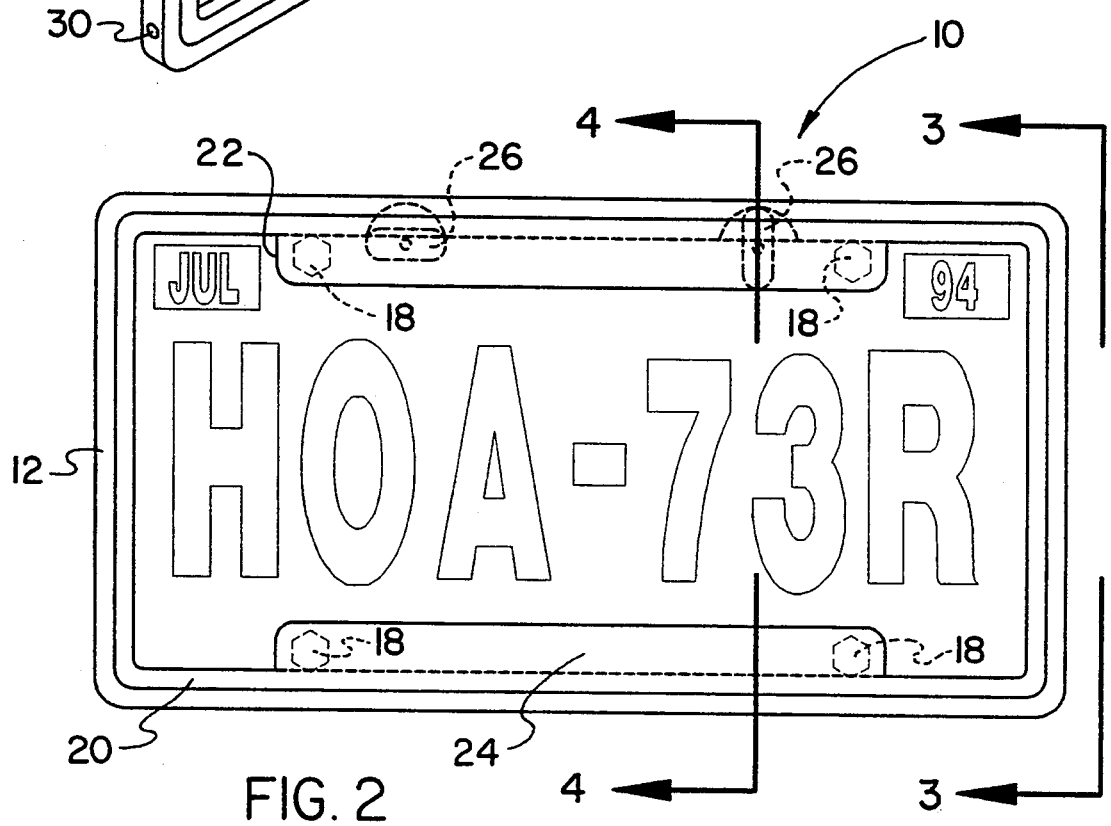
FIG. 2 is a front elevation view of the present invention.
Figure 3:
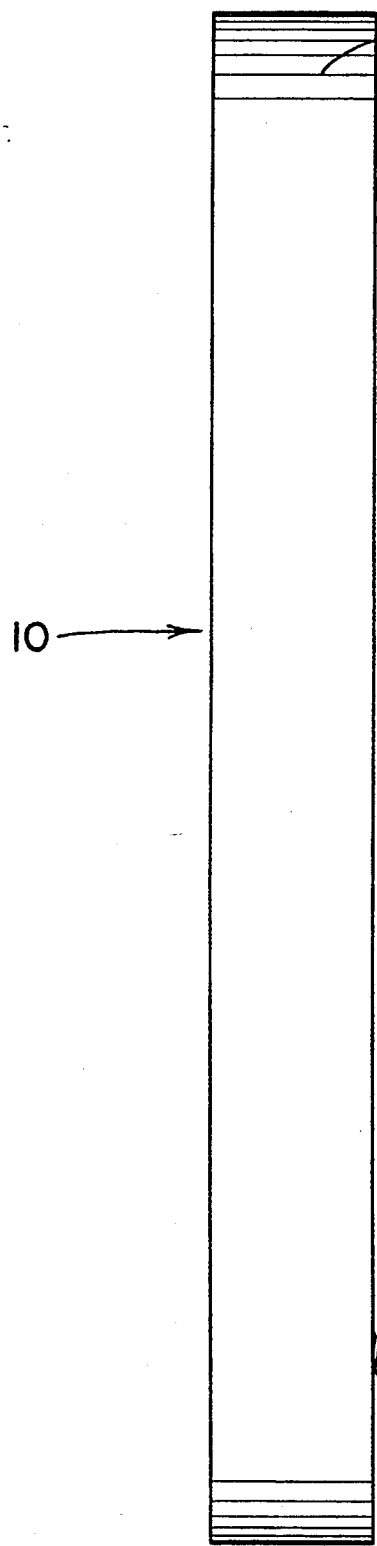
FIG. 3 is an enlarged side elevation view of the invention as seen from line 3—3 of FIG. 2.

An inner frame 20 is pivotally connected to the outer frame 12 and is dimensioned to fit therewithin, as best illustrated in FIGS. 1 and 2. The inner frame includes upper and lower bolt guards 22, 24 which effectively shield and preclude access to the license plate bolts 18 when the two frames 12, 20 are positioned in a coplaner relationship.

The frames 12, 20 may be releasably secured together by a rotation of at least one locking member 26. The locking members 26 are pivotally mounted to the inner frame 20 and may be rotated into engagement with the outer frame 12, as best illustrated in FIGS. 2 and 4. The locking members 26 are effectively hidden from view by the upper bolt guard 22, thereby rendering their location secret to unauthorized users.

In use, the license plate security frame 10 may be installed on a vehicle body by inserting the license plate 14 into the outer frame 12 and securing the assembly to the vehicle body through a well understood use of the license plate bolts 18. The inner frame 20 may then be pivoted into a coplaner relationship with respect to the outer frame 12 and secured thereto by a rotation of the locking members 26 from beneath the upper bolt guard 22. The security frame 10 effectively precludes access to the license plate bolts 18, thereby preventing a theft or unauthorized removal of the license plate 14 from the associated vehicle.

More specifically, it will be noted that the license plate security frame 10 comprises a substantially rectangularly shaped outer framed 12 having a backing plate 16 of a size generally slightly larger than a license plate 14, and a perimeter side wall 28 which extends orthogonally around a perimeter of the backing plate 16, as best illustrated in FIG. 4. The outer frame 12 is dimensioned in such a manner so as to receive a license plate 14 within the confines of the perimeter side wall 28, whereby license plate bolts 18 may be extended through apertures in both the license plate and the backing plate 14 and secured to a vehicle body in a well understood manner.

An inner frame 20 is pivotally connected to the outer frame 12 by a pair of pivot pins 30 which extend through unlabeled apertures in both frames. The inner frame 20 is dimensioned to be received within the confines of the outer frame 12 and therefore, has a slightly smaller height and width, as best illustrated in FIGS. 1 and 2. The inner frame 20 is provided with an upper bolt guard 22 and a lower bolt guard 24 which effectively preclude access to the license plate bolts 18 when the inner frame 20 is positioned in a coplaner relationship with respect to the outer frame 12, as best illustrated in FIG. 4.

The inner frame may be secured in such a relationship to the outer frame 12 by a pair of locking members 26 which are pivotally mounted to the interior surface of the upper bolt guard 22 by a locking member pivot 32 which may comprise a threaded fastener, stud, or the like. The locking members 26 each comprise generally oval shaped member which may be rotated about the locking member pivot 32 into either a clearance position or an engagement position with a notch 34 in the perimeter side wall 28 of the outer frame 12. Because of their location behind the upper bolt guard 22, the locking members 26 are effectively hidden from view and therefore, are operable only by one who knows of their location.

In use, the license plate security frame 10 may be installed on a vehicle body by inserting the license plate 14 into the outer frame 12 and securing the assembly to the vehicle body through a well understood use of the license plate bolts 18. The inner frame 20 may then be pivoted into a coplaner relationship with respect to the outer frame 12 and secured there to by a rotation of the locking members 26 from beneath the upper bolt guard 22. The security frame 10 effectively precludes access to the license plate bolts 18, thereby preventing a theft or unauthorized removal of the license plate 14 from the associated vehicle.

Figure 5:
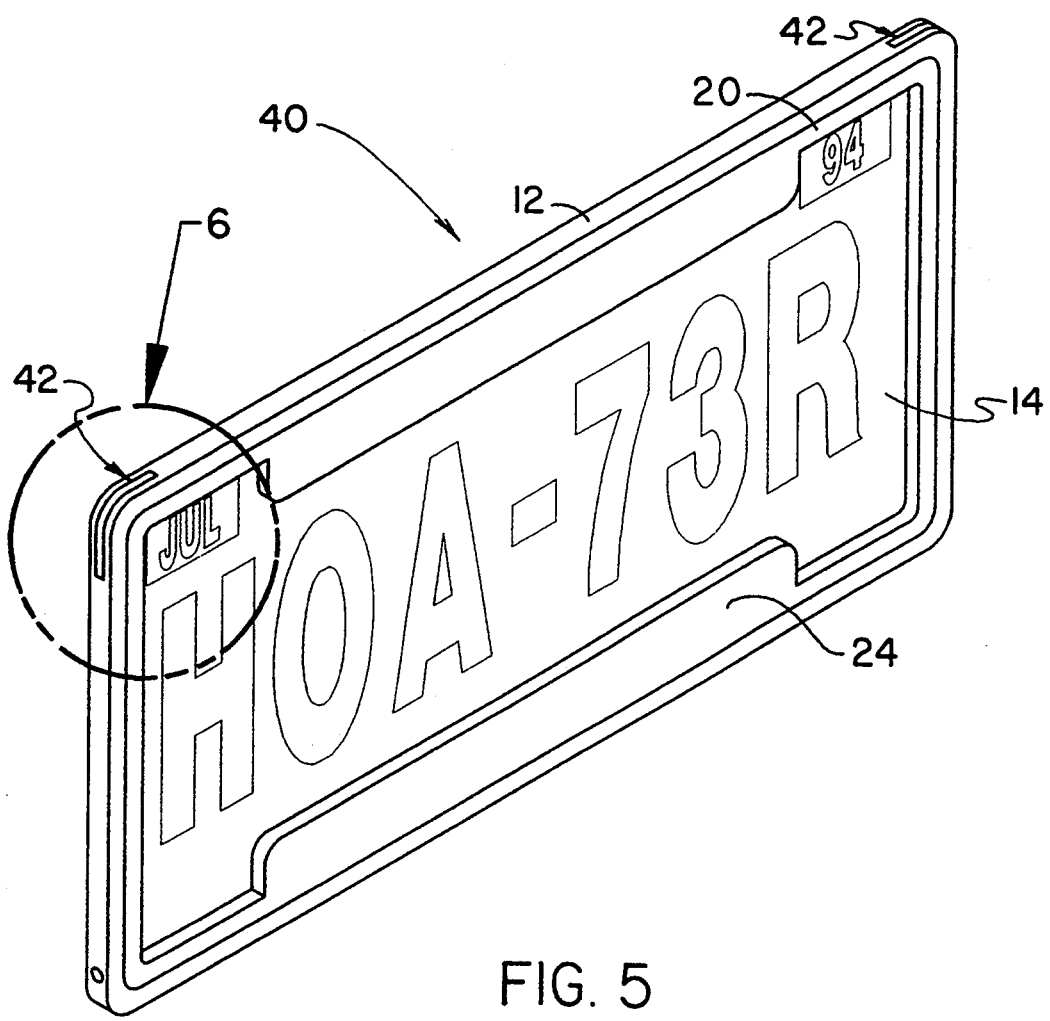
FIG. 5 is a perspective view of a second embodiment of a license plate security frame comprising the present invention.
Figure 6:
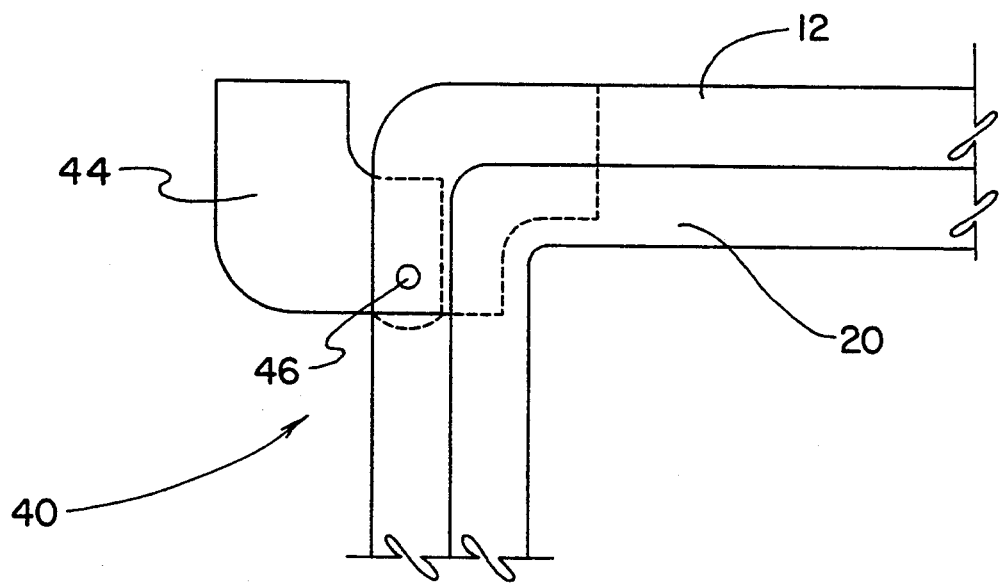
FIG. 6 is an enlarged front elevation view of a portion of the second embodiment indicated by the circled area of FIG. 5.

A second embodiment of the present invention, as generally designated by the reference numeral 40, which comprises substantially all of the features and structure of the foregoing embodiment 10 and which further comprises a pair of corner lock assemblies 42 will now be described. As best shown in FIGS. 5–6, it can be shown that the frames 12, 20 each have a right-angle planer aperture extending along each corner thereof in a direction parallel to that of the backing plate 16. As best illustrated in FIG. 6, each corner lock assembly 42 comprises a corner locking member 44 which is pivotally mounted to the outer frame 12 by a corner locking member pivot 46 that allows the corner locking member to be pivoted either into an unlocked position, as illustrated in FIG. 6, or a lock position as illustrated in FIG. 5. The corner lock assemblies 42 are intended to further secure the frames 12, 20 together and should be inconspicuously constructed and mounted so as to not easily be noticed by an unauthorized person.

Figure 7:
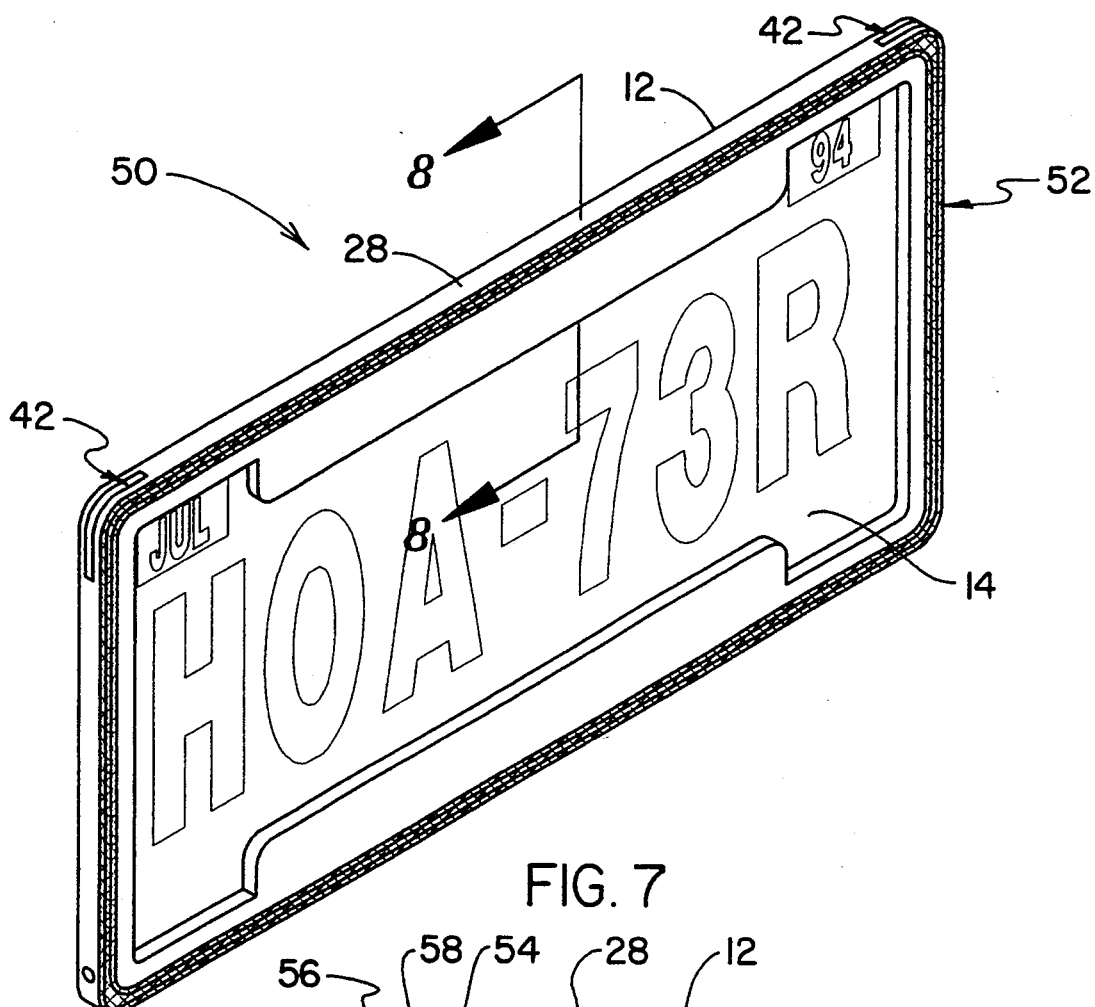
FIG. 7 is a perspective view of a third embodiment of a license plate security frame comprising of the present invention.
Figure 8:
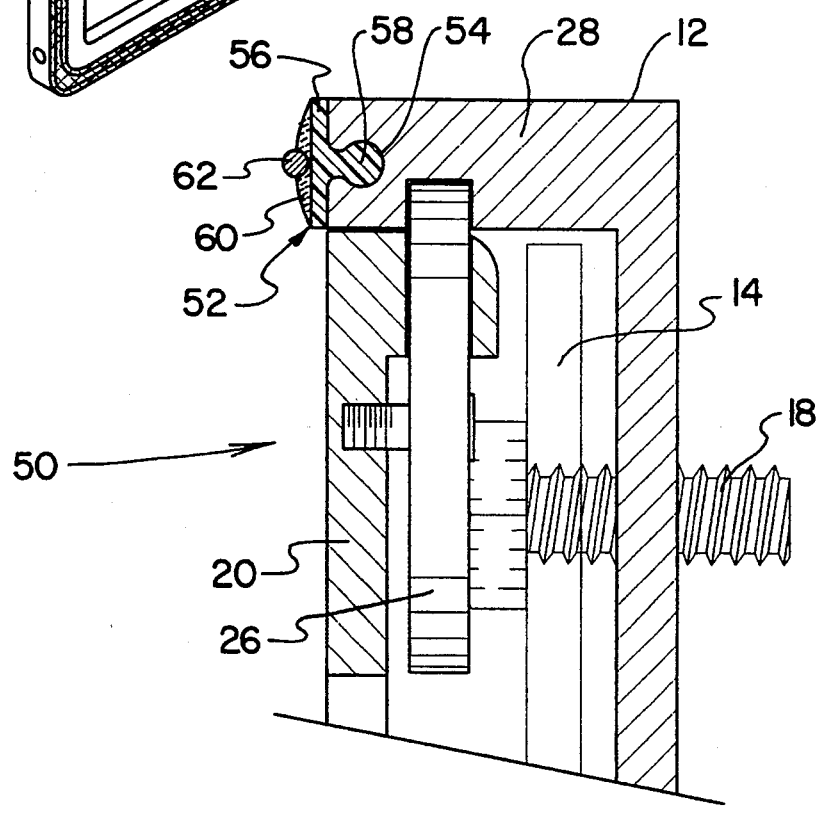
FIG. 8 is a cross-sectional view taken on line 8—8 of FIG. 7 detailing a portion of the third embodiment.

Comprising substantially all of the features and structure of the previous embodiments 10, 40 is a third embodiment which is generally designated by the reference numeral 50 and may be viewed in FIGS. 7–8. With reference to these Figures and concurrent reference to the Figures previously discussed, it can be shown that the third embodiment 50 further comprises an electric shock assembly 52 which extends around the front of the perimeter side wall 28 of the outer frame 12. As best illustrated in FIG. 8, the perimeter sidewall 28 includes a circumferentially extending journal 54. An insulator 56 having a projection 58 received within the journal 54 extends around the front of the perimeter side wall 28. The insulator 56 is constructed of a substantially elastomeric material which allows the projection 58 to be snapped into the journal 54, thereby allowing the electric shock assembly 52 to be easily installed into the outer frame 12.

The insulator 56 supports a reflective surface 60 and an exposed wire 62, as best illustrated in FIG. 8. The exposed wire 62 is intended to be electrically connected to an appropriate shock producing device which generates a high voltage, low current potential between the wire and the license plate security frame 50. Appropriate shock producing devices are known and examples as such can be seen in U.S. Pat. Nos. 5,193,048, 4,092,695, and 3,900,770.

Regardless of the conventionally known shock producing device utilized to generate a voltage potential between the exposure wire 62 and the license plate security frame 50, such arrangement is intended to be electrically connected to and activated by either a conventionally known vehicle alarm system or the ignition switch of the vehicle. In either case, the electric shock assembly 52 should be energized only when the vehicle is not in use, thereby reducing the possibility of accidental contact by authorized persons during a use of a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new license plate security frame for use with a vehicle and a license plate having apertures for receiving bolts, said frame comprising:

an outer frame having a backing plate with a perimeter and a side wall extending generally orthogonally around said perimeter of said backing plate, said backing plate including a plurality of through-extending apertures aligned with said apertures in said license plate;

an inner frame positionable within said outer frame and pivotally connected to said outer frame;

an upper bolt guard having a back side and coupled to said inner frame and positioned to cover at least one of said bolts;

a lower bolt guard coupled to said inner frame and positioned to cover at least one of said bolts;

a pair of locking members rotatably coupled to said back side of said upper bolt guard and engageable to said outer frame to secure said frames in a coplanar relationship, whereby said locking members are hidden from view; and, a pair of corner lock means for further securing said frames together.

2. The new license plate security frame of claim 1, wherein said frames each have corners with a right-angle aperture extending through two of said corners, and further wherein said corner lock means comprises a corner locking member pivotally coupled to said outer frame and selectively positionable partially within said right-angle aperture of said inner frame to releasably secure said frames together.

3. The new license plate security frame of claim 2, and further comprising an electric shock means for providing a high voltage, low current shock to an unauthorized user.

4. The new license plate security frame of claim 3, wherein said electric shock means comprises an insulator positioned along said side wall and extending around said outer frame; and an exposed wire positioned upon said insulator and connectable to an electric shock generating means responsive to a use of said vehicle for energizing said wire when said vehicle is not in use.

* * * * *